United States Patent [19]
Wiggins et al.

[11] Patent Number: 4,757,119
[45] Date of Patent: Jul. 12, 1988

[54] EPOXY RESIN COMPOSITIONS CONTAINING POLY-(HYDROCARBYLTHIO)AROMATIC DIAMINES

[75] Inventors: Paul L. Wiggins; Gordon G. Knapp, both of Baton Rouge, La.

[73] Assignee: Ethyl Corporation, Richmond, Va.

[21] Appl. No.: 45,521

[22] Filed: May 4, 1987

[51] Int. Cl.$^4$ .............................................. C08G 59/50
[52] U.S. Cl. ..................................... 525/504; 528/99; 528/109; 528/373
[58] Field of Search .................... 528/109, 373, 99; 525/504

[56] References Cited

U.S. PATENT DOCUMENTS

| | | | |
|---|---|---|---|
| 2,941,003 | 6/1960 | Shokal | 528/109 X |
| 3,005,803 | 10/1961 | Holtschmidt et al. | 528/109 X |
| 3,155,743 | 11/1964 | Newey | 528/109 X |
| 3,350,423 | 10/1967 | Carlyle | 528/109 X |
| 4,020,030 | 4/1977 | Harris et al. | 528/109 X |
| 4,595,742 | 6/1986 | Nalepa et al. | 528/64 |

FOREIGN PATENT DOCUMENTS 1129281  11/1962  Fed. Rep. of Germany .

Primary Examiner—Earl Nielsen
Attorney, Agent, or Firm—Patricia J. Hogan

[57] ABSTRACT

Novel compositions suitable for use in preparing prepregs comprise an epoxy resin and a poly(hydrocarbylthio)aromatic diamine curing agent, preferably a substituted di(alkylthio)-diaminobenzene wherein the alkylthio groups contain 1–10 carbons.

20 Claims, No Drawings

EPOXY RESIN COMPOSITIONS CONTAINING POLY-(HYDROCARBYLTHIO)AROMATIC DIAMINES

FIELD OF INVENTION

This invention relates to epoxy resin compositions and more particularly to such compositions containing aromatic diamine curing agents.

BACKGROUND

As disclosed in German Pat. No. 1,129,281 (Nischk et al.), it is known that epoxy resins can be cured with aromatic diamines and that certain advantages can be achieved by the use of 1-alkylthio-2,4-diaminobenzenes as the diamine curing agents. However, it has been found that the 1-alkylthio-2,4-diaminobenzenes of Nischk et al. are more reactive than is sometimes desired, e.g., when the curing agent is to be used in preparing prepregs.

U.S. Pat. No. 4,595,742 (Nalepa et al.) teaches that polyurethanes can be cured with aromatic diamines bearing more than one ar-alkylthio substituent.

SUMMARY OF INVENTION

An object of this invention is to provide novel epoxy resin compositions.

Another object is to provide such compositions which utilize (hydrocarbylthio)aromatic diamine curing agents that are less reactive than the curing agents of Nischk et al.

Still another object is to provide such compositions having high glass transition temperatures and other desirable properties.

A further object is to provide such compositions which are suitable for preparing prepregs.

These and other objects are attained by mixing an epoxy resin with a poly(hydrocarbylthio)aromatic diamine curing agent and, when curing is desired, heating the resultant composition to cure the resin.

DETAILED DESCRIPTION

Epoxy resins utilizable in the practice of the invention are the monomeric and polymeric epoxy resins containing an average of more than one vicinal epoxy group per molecule, i.e., all of the materials known as epoxy resins. These resins may be saturated or unsaturated, aliphatic, cycloaliphatic, aromatic, or heterocyclic, as disclosed, e.g. in Lee et al., *Handbook of Epoxy Resins*, McGraw-Hill Book Company (New York), 1967, the teachings of which are incorporated herein in toto by reference. Such resins, of course, are well known and are most commonly reaction products of epichlorohydrin with hydroxyl compounds such as bisphenol A, tetrabromobisphenol A, resorcinol, novolacs, p-aminophenol, 1,1,2,2-tetra(p-hydroxyphenyl)ethane, 1,1,3-tris(p-hydroxyphenyl)propane, 1,4-butanediol, glycerol, poly(oxypropylene)glycol, etc., or with polyamino compounds, such as methylenedianiline, etc. Particularly preferred are the tetraglycidylmethylenedianiline, tetraglycidyl 4,4-(4-aminophenyl)-p-diisopropylbenzene, tetraglycidyl 4,4-(4-amino-3,5-dimethylphenyl)-p-diisopropylbenzene, triglycidyl tris(hydroxyphenyl)methane, diglycidyl ether of bisphenol A, epoxy novolac, and triglycidyl p-aminophenol epoxy resins.

Curing agents which can be used in the practice of the invention are poly(hydrocarbylthio)aromatic diamines. These are primary aromatic diamines which have at least two hydrocarbylthio groups attached to the same ring as at least one of the amino groups in an aromatic nucleus comprising one or more rings, such as a benzene, naphthalene, anthracene, biphenyl, or diphenyl ether, sulfide, sulfoxide, sulfone, or alkane nucleus or the like, and which optionally bear other substituents, such as alkyl, chloro, fluoro, nitro, etc., on the ring positions that are unoccupied by amino or hydrocarbylthio substituents. The hydrocarbylthio substituents may be saturated or unsaturated aliphatic, cycloaliphatic, or aromatic hydrocarbylthio groups such as methylthio, ethylthio, propylthio, butylthio, hexylthio, decylthio, allylthio, cyclopentylthio, cyclohexylthio, phenylthio, benzylthio, p-tolylthio, etc., but are preferably alkylthio groups containing 1–10, more preferably 1–6, carbon. Particularly preferred curing agents are the substituted and unsubstituted di(alkylthio)diaminobenzenes in which the alkylthio groups contain 1–10, more preferably 1–6, carbons.

The poly(hydrocarbylthio)aromatic diamine employed as a curing agent may be a substantially pure compound, a mixture of two or more poly(hydrocarbylthio)aromatic diamines, or a mixture of one or more poly(hydrocarbylthio)aromatic diamines with corresponding aromatic diamines containing fewer than two hydrocarbylthio groups. It is ordinarily preferred that any mixtures comprise at least 10%, more preferably at least 20%, and most preferably at least 50%, of at least one poly(hydrocarbylthio)aromatic diamine. When not available, these compounds and mixtures can be prepared by the process of U.S. Pat. No. 4,594,453 (Ranken et al.), the teachings of which are incorporated herein in toto by reference.

Exemplary of the utilizable poly(hydrocarbylthio)aromatic diamines are 2,4-di(methylthio)-1,3-diaminobenzene, 4,6-di(methylthio)-1,3-diaminobenzene, 2,4,6-tri(methylthio)-1,3-diaminobenzene, 3,5-di(methylthio)-2,4-diaminotoluene, 3,5-di-(ethylthio)-2,4-diaminotoluene, 3-methylthio-5-ethylthio-2,4-diaminotoluene, 3-methylthio-5-ethylthio-2,4-diaminochlorobenzene, 6-nitro-3,5-di(methylthio)-2,4-diaminotoluene, 6-carbomethoxy-3,5-di(propylthio)-2,4-diaminoethylbenzene, 3,5-di-(methylthio)-2,4-diaminoethoxybenzene, 3,5-di(methylthio)-2,6-diaminotoluene, 1,4-diamino-2,3-di(methylthio)naphthalene, 4,4'-diamino-3,3',5,5'-tetra(methylthio)biphenyl, 4,4'-ethylidenebis[2,6-di(methylthio)aniline], 4,4'-methylenebis[2,6-di(ethylthio)aniline], 2,2'-methylenebis-[4,6-di-(methylthio)aniline], 3,3',5-tri(methylthio)-4,4'-diaminodiphenylmethane, etc., and mixtures thereof. Among the preferred curing agents are 3,5-di(methylthio)-2,4-diaminotoluene and mixtures thereof with 3,5-di(methylthio)-2,6-diaminotoluene.

The amount of diamine curing agent employed is generally a substantially equivalent amount, although smaller or larger amounts can be used if desired. Most commonly, the concentration of diamine is in the range of about 0.5–2, preferably about 0.8–1.5, equivalents.

The compositions of the invention are prepared by mixing the epoxy resin and curing agent as liquids, the ingredients being heated when it is necessary to liquefy them. When desired, conventional additives such as pigments, dyes, fillers, flame retardants, other resins, diluents, etc., may also be incorporated.

Curing, or chain extension, of the epoxy resins is accomplished in the conventional manner by heating the epoxy resin/curing agent compositions to a curing temperature, normally a temperature in the range of about 100°–200° C.

The invention is particularly advantageous in that it provides epoxy resin compositions having desirable properties, including reasonably high glass transition temperatures, and in that it provides the compositions by the use of curing agents which are less reactive than the curing agents of Nischk et al. The comparatively low reactivity of the curing agents makes the compositions particularly useful in making prepregs by wetting a fibrous reinforcement, e.g., a roving or a woven or unidirectional carbon, ceramic, or glass fiber reinformcement, etc., with the epoxy resin/curing agent composition and partially curing the resin.

The following examples are given to illustrate the invention and are not intended as a limitation thereof. In these examples the epoxy resins used were:

A—a commercial tetraglycidylmethylenedianiline having an epoxide equivalent of 125
B—a commercial diglycidyl ether of bisphenol A having an epoxide equivalent of 189
C—a commercial epoxy novolac resin having an epoxide equivalent of 178
D—a commerical triglycidyl p-aminophenol having an epoxide equivalent of 100
E—a commerical diglycidyl ether of bisphenol A having an epoxide equivalent of 183

The curing agents used for cmparative purposes were:

DETDA—a commercial mixture of 3,5-diethyl-2,4-diaminotoluene and 3,5-diethyl-2,6-diaminotoluene in a ratio of about 80:20.
MM-2,4-TDA—a mixture of 33% 3-methylthio-2,4-diaminotoluene and 67% 5-methylthio-2,4-diaminotoluene
DDS—4,4'-diaminodiphenylsulfone The curing agents of the invention that were used were:

MTMPDA—a mixture of 1%, 1,3-diaminobenzene, 8% 2-methylthio-1,3-diaminobenzene, 29% 4-methylthio-1,3-diaminobenzene, 47% 2,4-di(methylthio)-1,3-diaminobenzene, 8% 4,6-di(methylthio)-1,3-diaminobenzene, and 7% 2,4,6-tri(methylthio)1,3-diaminobenzene
MT-2,4-TDA—a mixture of 1% 3-methylthio-2,4-diaminotoluene, 54% 5-methylthio-2,4-diaminotoluene, and 45% 3,5-di(methylthio)-2,4-diaminotoluene
MT-2,6-TDA—a mixture of 1% 2,6-diaminotoluene, 79% 3-methylthio-2,6-diaminotoluene, and 19% 3,5-di(methylthio)-2,6-diaminotoluene
DM-2,4-TDA—3,5-di(methylthio)-2,4-diaminotoluene
DE-2,4-TDA—3,5-di(ethylthio)-2,4-diaminotoluene
DM-c-TDA—a commercial mixture of 3,5-di(methylthio)-2,4-diaminotoluene and 3,5-di(methylthio)-2,6-diaminotoluene in a ratio of about 80:20

EXAMPLE I

The reactivities of several curing agents were evaluated by mixing the curing agents with epoxy resins in substantially equivalent amounts, placing a drop of the sample to be tested in a Tg pan, scanning with a DSC at a heating rate of 10° C./min. from 30° C. to 300° C., and determining the onset and peak exothermic temperatures. The epoxy resins and curing agents used and the results of the evaluation are shown in Table I.

TABLE I

| Epoxy Resin/Curing Agent | Onset Exothermic Temperature (°C.) | Peak Exothermic Temperature (°C.) |
|---|---|---|
| A/DETDA | 177 | 208 |
| A/DDS | 195 | 234 |
| A/DM-c-TDA | 219 | 257 |
| B/DETDA | 141 | 195 |
| B/DDS | 176 | 225 |
| B/MM-2,4-TDA | 151 | 192 |
| B/MTMPDA | 166 | 212 |
| B/MT-2,4-TDA | 158 | 204 |
| B/MT-2,6-TDA | 163 | 206 |
| B/DM-2,4-TDA | 195 | 237 |
| B/DE-2,4-TDA | 203 | 245 |
| B/DM-c-TDA | 199 | 240 |
| C/DETDA | 134 | 190 |
| C/DDS | 174 | 218 |
| C/DM-c-TDA | 197 | 232 |
| D/DETDA | 164 | 201 |
| D/DM-c-TDA | 212 | 242 |

EXAMPLE II

Various amounts of curing agents were blended with aliquots of Epoxy Resin E to provide formulations which were cured by heating them for two hours at 100° C. and four hours at 175° C. The glass transition temperatures of the cured samples were then determined. The identities of the curing agents, the amounts employed, and the glass transition temperatures of the cured samples are shown in Table II.

TABLE II

| Curing Agent | Concentration (equivalents) | Tg(°C.) |
|---|---|---|
| MT-2,4-TDA | 0.92 | 133 |
| " | 0.96 | 131 |
| " | 1.00 | 148 |
| " | 1.04 | 154 |
| " | 1.08 | 156 |
| " | 1.11 | 152 |
| DM-2,4-TDA | 0.95 | 136 |
| " | 1.01 | 150 |
| " | 1.05 | 148 |
| " | 1.08 | 154 |
| " | 1.15 | 160 |
| " | 1.22 | 164 |
| " | 1.25 | 163 |

EXAMPLE III

Three unfilled castings were prepared by blending an epoxy resin with a curing agent to provide a formulation which was then cured by Cure Cycle 1 (four hours at 110° C., three hours at 150° C., and two hours at 200° C.) or Cure Cycle 2 (two hours at 100° C. and four hours at 175° C.). The compositions of the formulations and the physical properties of the castings are shown in Table III.

TABLE III

| | | | |
|---|---|---|---|
| Epoxy Resin A, phr | 100 | — | — |
| Epoxy Resin D, phr | — | 100 | — |
| Epoxy Resin B, phr | — | — | 100 |
| DM-c-TDA, phr | 42.9 | 53.1 | — |
| MT-2,4-TDA | — | — | 23.5 |
| Cure Cycle | 1 | 1 | 2 |
| Tensile strength, psi | 10,600 | 9,900 | 10,100 |
| Tensile modulus, psi | 939,000 | 542,000 | 340,000 |
| % Elongation | 1.5 | 2.6 | 3.5 |
| Flexural strength, psi | 21,700 | 18,000 | 20,000 |
| Flexural modulus, psi | 595,000 | 589,000 | 450,000 |
| Compressive strength, psi | 35,900 | 34,000 | — |
| Tg (DMTA), °C. | 237 | 237 | — |
| Tg (DSC), °C. | 235 | — | 163 |

TABLE III-continued

| Deflection temperature, °C. | 220 | 199 | 144 |
|---|---|---|---|
| Durometer hardness | 92 | 92 | 90 |
| Specific gravity | 2.01 | 1.97 | 1.21 |

It is obvious that many variations can be made in the products and processes set forth above without departing from the spirit and scope of this invention.

What is claimed is:

1. A composition comprising an epoxy resin and a poly(hydrocarbylthio)aromatic diamine curing agent.

2. The composition of claim 1 wherein the epoxy resin is a tetraglycidylmethylenedianiline epoxy resin.

3. The composition of claim 1 wherein the epoxy resin is a diglycidyl ether of bisphenol A.

4. The composition of claim 1 wherein the epoxy resin is an epoxy novolac resin.

5. The composition of claim 1 wherein the epoxy resin is a triglycidyl p-aminophenol epoxy resin.

6. The composition of claim 1 wherein the curing agent is a poly(alkylthio)aromatic diamine in which the alkylthio groups contain 1–10 carbons.

7. The composition of claim 6 wherein the curing agent is a substituted or unsubstituted di(alkylthio)-diaminobenzene.

8. The composition of claim 7 wherein the curing agent is 3,5-di(methylthio)-2,4-diaminotoluene.

9. The composition of claim 7 wherein the curing agent is a mixture of 3,5-di(methylthio)-2,4-diaminotoluene and 3,5-di(methylthio)-2,6-diaminotoluene.

10. A composition comprising an epoxy resin chain extended with a poly(hydrocarbylthio)aromatic diamine curing agent.

11. The composition of claim 10 wherein the epoxy resin is a tetraglycidylmethylenedianiline epoxy resin.

12. The composition of claim 10 wherein the epoxy resin is a diglycidyl ether of bisphenol A.

13. The composition of claim 10 wherein the epoxy resin is an epoxy novolac resin.

14. The composition of claim 10 wherein the epoxy resin is a triglycidyl p-aminophenol epoxy resin.

15. The composition of claim 10 wherein the curing agent is a poly(alkylthio)aromatic diamine in which the alkylthio groups contain 1–10 carbons.

16. The composition of claim 15 wherein the curing agent is a substituted or unsubstituted di(alkylthio)-diaminobenzene.

17. The composition of claim 16 wherein the curing agent is 3,5-di(methylthio)-2,4-diaminotoluene.

18. The composition of claim 16 wherein the curing agent is a mixture of 3,5-di(methylthio)-2,4-diaminotoluene and 3,5-di(methylthio)-2,6-diaminotoluene.

19. A prepreg comprising a fibrous reinforcement, an epoxy resin, and a poly(hydrocarbylthio)aromatic diamine curing agent.

20. The prepreg of claim 19 wherein the curing agent is a mixture of 3,5-di(methylthio)-2,4-diaminotoluene and 3,5-di(methylthio)-2,6-diaminotoluene.

* * * * *